J. H. MELLOY AND W. OWEN.
GEAR CUTTING, SLOTTING, AND LIKE MACHINE.
APPLICATION FILED FEB. 19, 1920.
1,422,462.
Patented July 11, 1922.
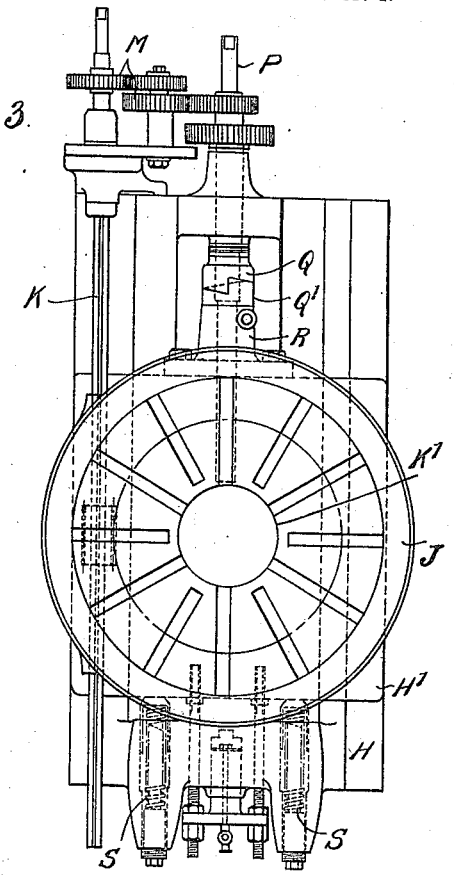
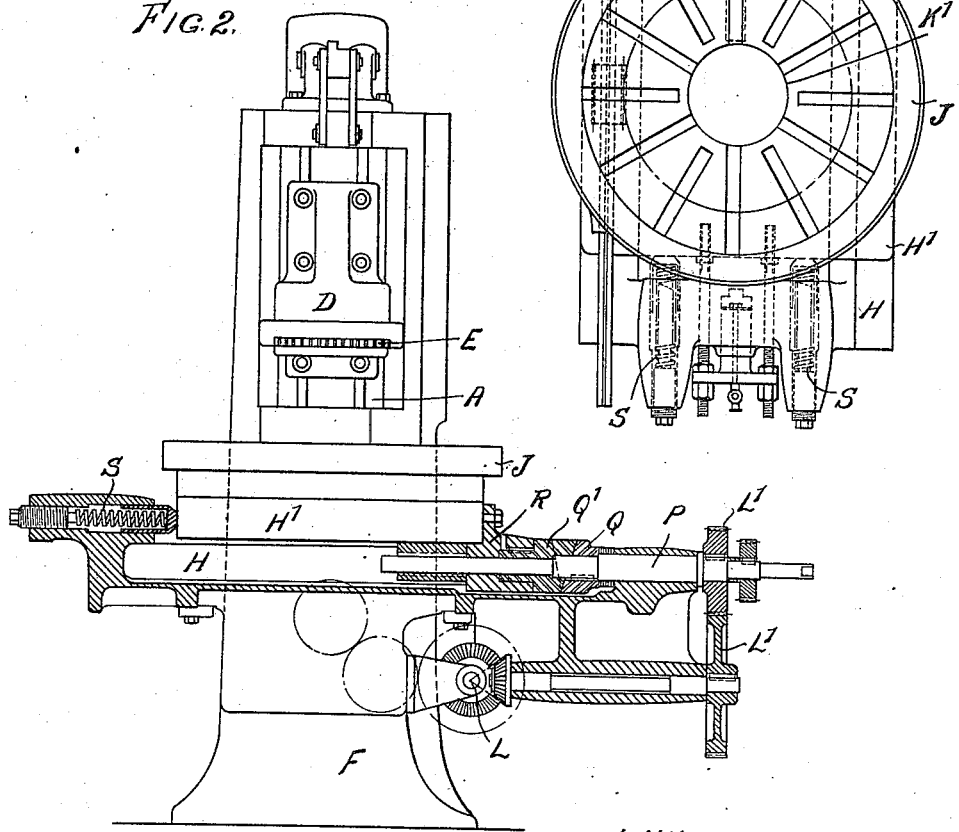
INVENTORS:
James H. Melloy
Willie Owen
By Wm Wallace White
ATT'Y.

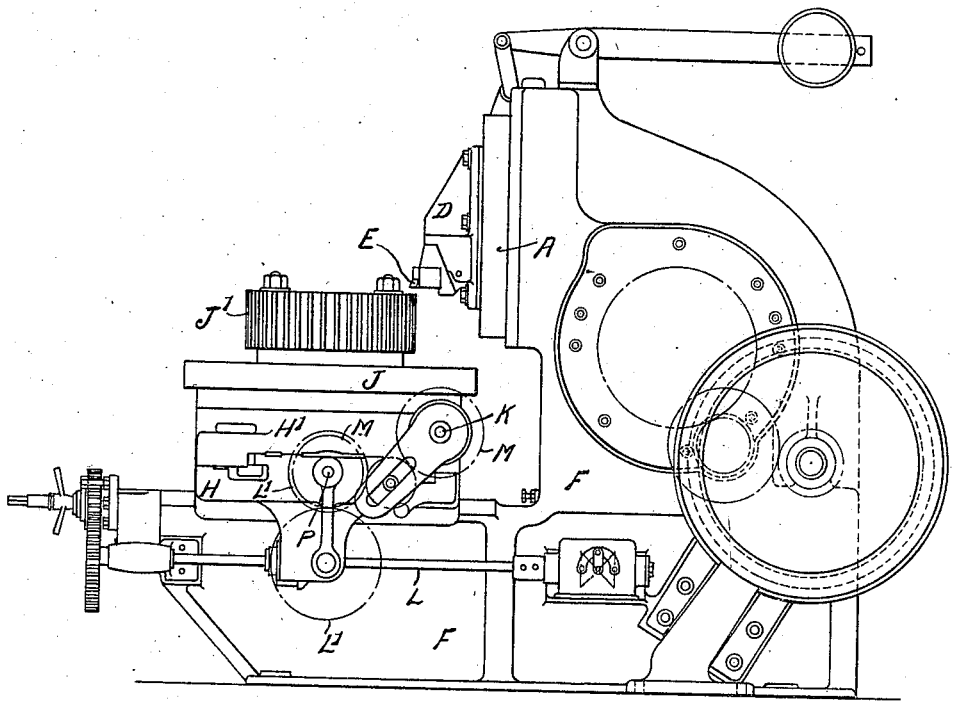

UNITED STATES PATENT OFFICE.

JAMES HENRY MELLOY AND WILLIE OWEN, OF MANCHESTER, ENGLAND, ASSIGNORS TO WM. MUIR AND COMPANY LIMITED, OF MANCHESTER, ENGLAND.

GEAR CUTTING, SLOTTING, AND LIKE MACHINE.

1,422,462.     Specification of Letters Patent.     Patented July 11, 1922.

Application filed February 19, 1920. Serial No. 359,893.

*To all whom it may concern:*

Be it known that we, JAMES HENRY MELLOY and WILLIE OWEN, both subjects of the King of Great Britain, the former residing at Britannia Works, Sherbourne Street, Manchester, in the county of Lancaster, England, and the latter at 7 Milton Street, Stretford, Manchester, aforesaid, have invented new and useful Improvements in and Relating to Gear Cutting, Slotting, and like Machines, of which the following is a specification.

This invention refers to improvements in and relating to machines for cutting teeth in spur and spiral gears in which a generating cutter having a reciprocating motion, is used.

The object of our invention is to simplify and expedite the cycle of operations in this type of machine by performing each periodic dividing or indexing motion instantly, by dropping the work back at the end of the rolling motion, a pitch or more than one pitch during the interval between the cutter leaving the work and re-entering it, in order that there may be no cessation or pause in the cutting.

A further object of our invention is to employ our improved cycle of operations in conjunction with a reciprocating generating cutter as above indicated and apply it to a work carrying table to which the master dividing wheel controlling the work is attached in such a manner as to obtain in the work both accuracy and rigidity, in order that the output from the machine may be limited only by the ability of the work blank or gear being operated upon to withstand, without distortion, the rapid removal of metal.

In carrying our invention into effect, we generally employ a machine of the type known as a slotting machine and preferably of the particularly powerful type known as a puncher slotting machine, but we do not bind ourselves to any particular type of reciprocating machine or form of construction; and the drawings herewith are merely an illustration of our invention, and not a limitation.

In the said drawings—Fig. 1 represents a side elevation of a machine arranged in accordance with our invention; Fig. 2 is a front elevation of the said machine showing a section through the work carrying table and a detail of the cam and springs for effecting the instantaneous return; Fig. 3 is a plan of the work carrying table shewing the cam and springs.

In this machine the ram slide A is given a reciprocating motion vertically in the usual way. This ram slide carries for the purposes of our invention the relieving tool box D. To this tool box is attached the cutter E, which in this case is rack formed.

The head and bed F as illustrated are cast in one piece, upon which on slideways is mounted a slide H carrying a cross slide H', which comprises the circular work table J. This table is adjustable towards the head of the machine and is provided with a large and accurate worm wheel K' for controlling and rotating the work blank or gear J' attached to the table.

The automatic rotation of the work is under the control of the ordinary feed motion and comes into operation when the tool is clear of the work at the top of the stroke. The feed motion is actuated in the ordinary way from the opposite side of the machine to that shown on the drawings through the shaft L which imparts rotary motion to the spur wheels L' on to the shaft P and through change wheels M to the worm shaft K. On the shaft P is mounted the scroll cam Q, Fig. 2, of a pitch equal to the pitch or a multiple of the pitch of the gear being operated upon, and this cam acting against a similar cam Q' fixed in a bracket R carried on the cross slide H' and prevented from rotating by key or other means, moves the cross slide and the work across. The motion thus imparted to the work acting in unison with the rotation of the work through the change wheels M and the worm shaft K, causes the pitch circle of the work to rotate along an imaginary plane described by the pitch line of the rack formed cutter E, thus establishing the necessary rolling motion between the cutter E and the work blank or gear J' being cut.

Upon the completion of each revolution of the shaft P and consequently the completion of one pitch or multiple thereof of the gear being cut, the cross slide H' (carrying the work table J and the work) under the influence of the springs S or other suitable means, drops instantly back a distance equal to the pitch of the cam, this movement being accomplished during the interval between the tool leaving the work and re-entering it.

The rolling motion again automatically recommences and the cycle of operations is repeated; thus there is no pause and no cessation of cutting between each consecutive cycle of operations.

What we claim as our invention and desire to secure by Letters Patent is:—

1. In a gear cutting machine, the combination with a constantly moving reciprocable cutter and a work-carrier mounted for reciprocation across the path of said cutter, of means for imparting to said work-carrier a step per stroke movement in one direction, and means for automatically imparting a quick return movement to said work-carrier after the desired complete pitch distance has been traversed, said movements occurring respectively during movement of the cutter away from and toward the work-carrier.

2. In a gear-cutting machine, the combination with a constantly moving reciprocable cutter and a work-carrier mounted for reciprocation across the path of said cutter, of means for imparting to said work-carrier a reciprocating movement in one direction and a rotative movement during movement of the cutter away from the work-carrier, and means for automatically imparting a quick reciprocating movement to said work-carrier in the opposite direction during movement of the cutter toward the work-carrier.

3. In a gear cutting machine, the combination with a reciprocable cutter and a work-carrier mounted for reciprocation across the path of said cutter, of an intermittently rotatable cam for imparting to said work-carrier a slow step per stroke movement in one direction during the return strokes of the cutters, and means for imparting a quick return movement to said work-carrier after the desired complete pitch distance has been traversed.

4. In a gear cutting machine, the combination with a reciprocable cutter and a work-carrier mounted for reciprocation across the path of said cutter, of means for imparting to said work-carrier a step per stroke slow movement in one direction during return strokes of the cutter, and a spring for imparting a quick return movement to said carrier after the desired complete pitch distance has been traversed.

5. In a gear cutting machine, the combination with a reciprocable cutter and a work-carrier mounted for reciprocation across the path of the said cutter, of a cam rotatable intermittently in one direction for imparting to said work-carrier a slow step per stroke movement in one direction, said cam having a pitch equal to an integer of the pitch of the gear to be cut, and resilient means for automatically moving the carrier in the opposite direction after the desired complete pitch distance has been traversed.

6. In a gear cutting machine, the combination with a reciprocable cutter and a work-carrier mounted for reciprocation across the path of said cutter, of a cam for imparting to said work-carrier a step per stroke slow movement in one direction during the return strokes of the cutter, said cam having a pitch equal to an integer of the pitch of the gear to be cut, a spring for imparting a quick return movement to said carrier after the desired complete pitch distance has been traversed, and means for imparting rotary motion to said cam.

7. In a gear cutting machine, the combination with a reciprocable cutter and a work-carrier mounted for reciprocation across the path of said cutter, of a member mounted for rotation in one direction and having a cam face, a member secured to said work carrier and having a face adapted to cooperate with said first member for imparting to the work carrier a slow step per stroke movement in one direction during the return strokes of the cutter, and means for imparting a quick return movement to said carrier after the desired complete pitch distance has been traversed.

8. In a gear cutting machine, the combination with a reciprocable cutter and a work-carrier mounted for rotation and for reciprocation across the path of said cutter, of a rotatable cam for moving said work-carrier in one direction during the return strokes of the cutter, means for imparting rotation to said cam, means for transmitting rotary motion from said last means to said work carrier, and springs for imparting a quick return movement across the path of the cutter to said carrier after the desired complete pitch distance has been traversed.

In testimony whereof we have signed our names to this specification.

JAMES HENRY MELLOY.
WILLIE OWEN.